United States Patent [19]
Odhner

[11] Patent Number: 5,118,272
[45] Date of Patent: Jun. 2, 1992

[54] EQUIPMENT FOR ERASER MANUFACTURE

[76] Inventor: Oliver R. Odhner, 28A Perkiomenville Rd., Perkiomenville, Pa. 18074

[21] Appl. No.: 418,861

[22] Filed: Oct. 6, 1989

Related U.S. Application Data

[63] Continuation of Ser. No. 235,538, Aug. 24, 1988, abandoned.

[51] Int. Cl.[5] .................. B26C 35/00; B26C 45/14
[52] U.S. Cl. ....................... 425/123; 249/93; 249/167; 425/125; 425/817 R
[58] Field of Search ............ 425/4 R, 817 R, 117, 425/123, 125, 805; 249/91, 93, 167, 160, 163

[56] References Cited

U.S. PATENT DOCUMENTS

| | | | |
|---|---|---|---|
| 223,844 | 1/1880 | Estabrook | 425/805 |
| 2,643,158 | 6/1953 | Baldanza | 425/805 |
| 2,878,069 | 3/1959 | Wessel, Jr. | 425/805 |
| 3,122,787 | 3/1964 | Adams | 425/4 R |
| 3,224,039 | 12/1965 | Kracht | 425/4 R |
| 3,268,635 | 8/1966 | Kraus et al. | 425/817 R |
| 3,610,692 | 3/1970 | Van der Molen | 425/805 |
| 3,687,413 | 8/1972 | Murfitt et al. | 425/805 |
| 4,007,509 | 2/1977 | Odhner | 15/159 A |

Primary Examiner—Jay H. Woo
Assistant Examiner—Khanh P. Nguyen
Attorney, Agent, or Firm—Frederick J. Olsson

[57] ABSTRACT

Equipment includes a cavity former and a hot and cold water tank. The cavity former holds fiberglass strips part of which are inside the cavity and part outside. The cavity former also holds polystyrene beads which surround the fiber glass strips inside the cavity. The cavity former is placed inside of the tank and exposed to hot water. The beads expand against the cavity to form the handle and expand against the fiber glass strips to lock the same in the handle. The hot water is changed to cold and this lowers the temperature of the formed eraser which is then removed.

4 Claims, 4 Drawing Sheets

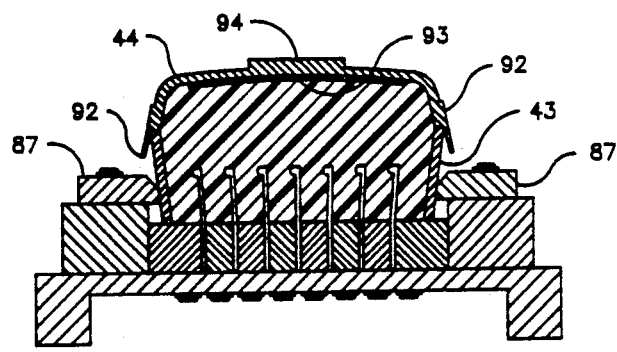
FIG 13
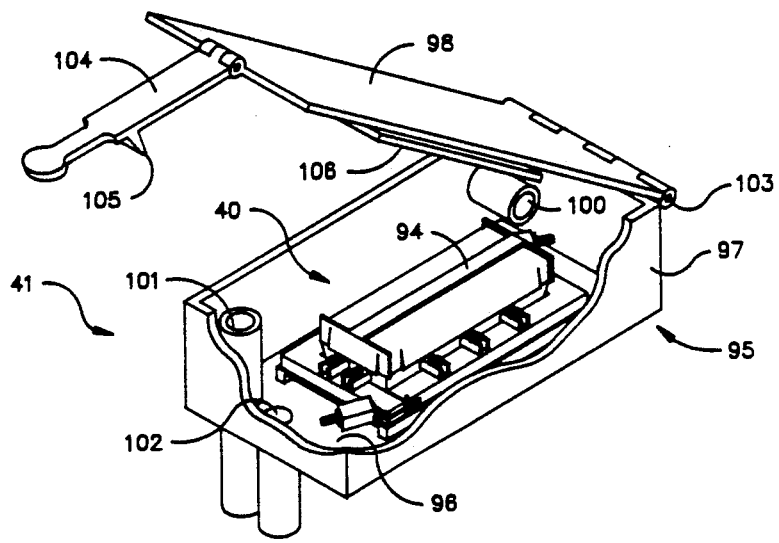
FIG 14
FIG 15
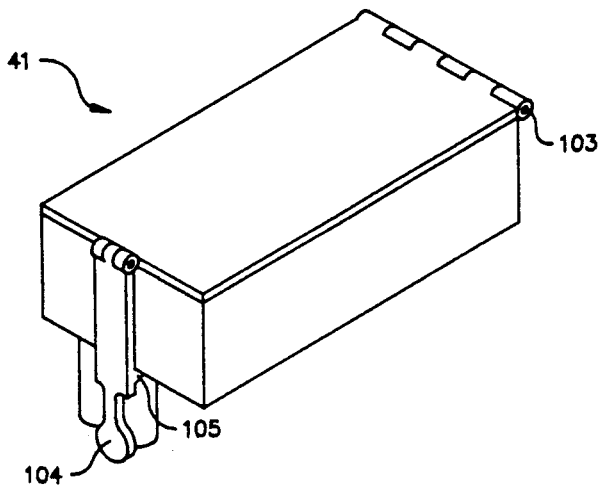
FIG 16
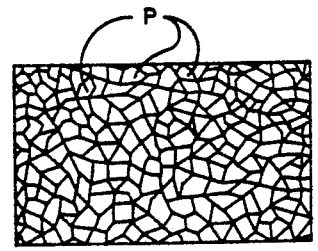

EQUIPMENT FOR ERASER MANUFACTURE this is a continuation of U.S. Pat. application having Ser. No. 07/235,538 filed on Aug. 24, 1988 now abandoned.

This invention relates to the manufacture of erasers for cleaning blackboards and in particular relates to equipment for the manufacture of an improved eraser of the kind shown in my U.S. Pat. No. 4,007,509.

This invention provides equipment for the manufacture of an eraser made from mold-expandable spherical plastic particles and fiberglass strips, each fiberglass strip having an inside part and an outside part with the inside part being encapsulated by the particles which exert pressure thereon to lock the strip in the handle and with the outside part extending outwardly from the bottom of the handle to form cleaning means to remove material from a board.

According to the invention, the equipment or mold means comprises a cavity former for particle expansion and a temperature conditioning means to raise the temperature of the particles for expansion and to cool the formed eraser. A fixture holds the fiberglass strips in a desired pattern wherein the inside parts are exposed and the outside parts are gripped so as to be shielded from molding material A hollow receiver is mounted on the fixture to form a chamber therewith. The chamber holds heat expandable plastic particles which are placed in the chamber so as to surround the exposed inside parts. A shaper is mounted on the receiver. The fixture, receiver, and shaper are designed to form a cavity means for the expansion of the particles. The cavity means is placed within temperature condition means which function to raise the temperature of the particles by subjecting the cavity means to a hot water bath. After expansion has taken place, the temperature conditioning means subjects the cavity means to a cold water bath to cool down the formed eraser. Then, the equipment is opened for removal of the eraser.

The principal objective of the invention is to provide equipment for the manufacture of an eraser of the kind in question which is substantially lower in cost than the eraser of my patent and thereby making this superior eraser more widely available.

The equipment will be described below in connection with the following drawings wherein:

FIG. 13 is a sectional elevational view illustrating the eraser as formed by the molding equipment;

FIG. 14 is a perspective view of components of temperature conditioning means for receiving the cavity former and raising the temperature of the heat expandable particles and lowering the temperature of the formed eraser;

FIG. 15 is a perspective view showing the condition of the parts of FIG. 14 when raising or lowering the temperature; and FIG. 16 is a fragmentary view of a section of the surface of a finished eraser to illustrate the knitting of the expanded particles.

The term "blackboard" used herein is inclusive of chalkboards such as are made of slate and variously colored ceramic as well as the so-called "whiteboards" which are made of synthetic material particularly adapted to be marked on by ink-type markers, the ink being of the kind which can be wiped off of the board. As will be pointed out more specifically later on, the fiberglass filaments of the eraser are ideally suited for use on whiteboards. The term "viewable" as user herein refers to chalk material as placed on blackboards and also to ink as used on whiteboards.

Figure 1:
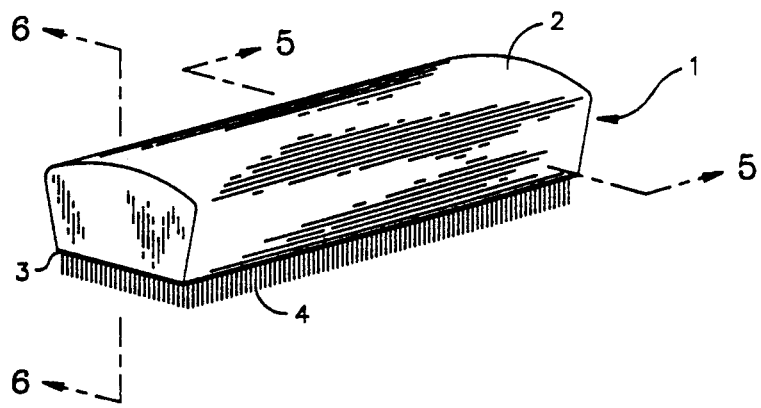
FIG. 1 is a perspective view of the eraser.

In FIG. 1, the eraser 1 has a handle 2 which is contoured so that it can be conveniently gripped by the fingers and guided back and forth over a blackboard for the erasing or the material removing operation.

The bottom 3 of the eraser has fiberglass cleaning means 4 which will scrape off the chalk when the eraser is moved back and forth across a blackboard or will wipe off ink when the eraser is used on a whiteboard.

The handle 2 is manufactured in accordance with the molding method and the equipment for carrying out the method as disclosed herein.

The fiberglass cleaning means 4 and a typical method for its manufacture will be described later on.

The cleaning means 4 comprises millions of closely packed fiberglass filaments. The bottom 3 of the handle is essentially flat or planar and preferably the filaments are arranged to extend outwardly and relatively normal to the bottom. Each filament has a diameter between 0.00025 and 0.001 inches and a length (bottom to end) of between $\frac{3}{8}$ and $\frac{5}{8}$ inches. Filaments of the kind mentioned have several advantages. For example, the filaments have good wear qualities and are less likely to break and also function to enhance the chalk-scraping or ink-wiping efficiency by remaining stiff or upright while being moved and, thus, avoid matting of spreading of the chalk and the smearing of the ink.

The filaments can be arranged on the bottom in groups or rows with the groups or rows being separated to provide discrete spaces or channels between adjacent groups. The function of the channels is to collect the dust as it is scraped off a blackboard. The channels will collect ink being wiped off and the filaments themselves will also collect ink.

Figure 2:
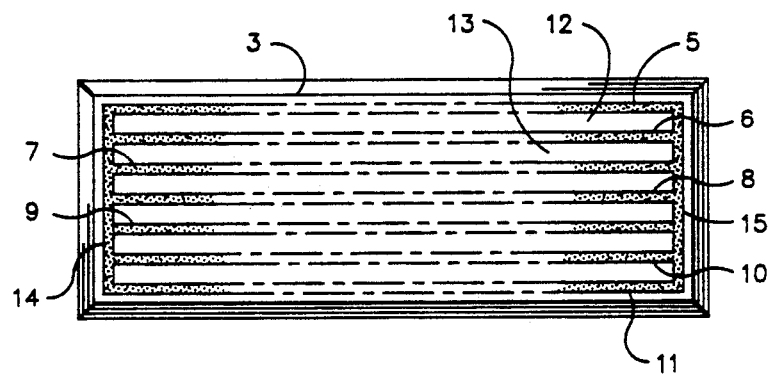
FIG. 2 is a bottom view of FIG. 1.

A preferred arrangement of the cleaning groups or rows is illustrated in FIG. 2. As noted, there are seven rows of filaments numbered 5 through 11. The rows are parallel to one another and adjacent rows are separated so as to form a channel. For example, the rows 5 and 6 are separated to form the channel 12. The rows 6 and 7 are separated to form the channel 13, etc.

As previously noted, the filaments all extend outwardly from the bottom 3 and the length of each filament is such that the locus of the extremities lies substantially in a plane. The structure is preferred to enhance the cleaning function. With reference to FIG. 2, it will be observed that the various rows 5 through 11 are all of the same length and terminate so that their respective ends lie in parallel planes.

In the preferred arrangement as shown in FIG. 2, the open ends of the channels are blocked or closed off so as to confine or box in the chalk dust as a blackboard is being cleaned. This is done by blocking rows of filaments as indicated at 14 and 15. The blocking rows lie in or adjacent to the planes encompassing the terminal ends of the rows 5 through 11. It is contemplated that the rows 14 and 15 are of the same structure as the rows 5 thru 11.

The channels and filaments have important advantages: first, the dust is less likely to be dispersed in the air; second, the eraser is self-cleaning, i.e. the same can be put down or tapped on the blackboard sill and the chalk dust falls away; and third, where the eraser is used to remove ink, the same can be simply washed off the filaments.

In the arrangement as noted in FIG. 2, it will be seen that the cleaning rows 5 and 11 together with the blocking rows 14 and 15 extend around the periphery of the handle. Thus, the rows 5 through 11 serve the blocking function as well as the cleaning function.

With respect to blocking rows, these rows may be eliminated where the eraser is dedicated for use on a whiteboard.

The structure of the rows or groups of filaments and the manner in which they are set up in the handle will be described in connection with FIGS. 3 through 7.

Figure 3:
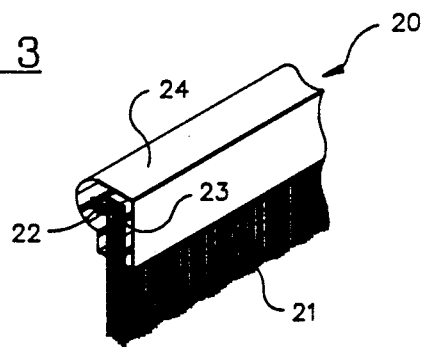
FIG. 3 is a perspective view of a portion of a fiberglass strip used in the eraser of FIG. 1.

Each row of fiberglass filaments is set up in an elongated strip-like form 20 as diagramatically illustrated in FIG. 3. The strip 20 includes the downwardly extending fiberglass filaments 21, a reinforcing strand 22 adjacent the edge 23 of the filaments, and a bead 24 (made of plastic or rubber) encapsulates the strand 22 and end 23 and locks the same together.

The strand 22 is shown disposed on the left side of the edge 23. It will be understood that the strand may be located on the right side or on the top side. The strand 22 is preferably made of fiberglass, however, other materials such as cotton cord which will serve as a reinforcing member for the strip 20 may be used. Also, it will be understood that a plurality of strands may be employed.

The handle for a classroom type eraser is about six inches in length. A handle for a custodial type eraser is about 18 inches in length. The strips 20 are formed in lengths appropriate for the particular eraser application.

Figure 4:
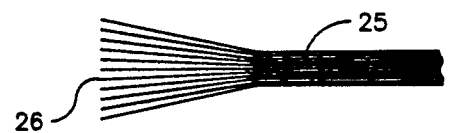
FIG. 4 is an enlarged perspective view of a strand of fiberglass.

The filaments 21 of the strip 20 are fabricated from a strand of fiberglass such as the strand 25 diagramatically illustrated in FIG. 4. A single strand consists of up to sixty ends 26 of fiberglass and each end comprises about 200 filaments. A typical strand may have 30 ends. A preferred strand is star roving 501-218 made by Manville, Box 1508, Denver, CO. In this strand the filaments have a diameter of approximately 0.001 inch.

The strip 20 is preferably manufactured according to the following technique. The strand 25 is payed off its roll and sequentially severed into short sections of the same length, the sections being laid side-by-side in a strip-like array. The reinforcing strip 22 is saturated with plastic adhesive such as Aropol 7320-1 polyester resin sold by Ashland Chemical Company. The saturated strand is laid down along the edge 23 of the filaments creating a bead of adhesive. The adhesive may be troweled or worked in so that it completely covers or encapsulates the end 23. The bead is subsequently cured so that it hardens into a dense hard mass. A drier such as cobalt naphthanate can be used to decrease the cure time of the polyester. The adhesive holds or locks the fibers tightly in position. The strips are cut to desired length and then positioned in the handle 2 as will be described below.

The adhesive may be worked on the edge 23 so that the bead 24 is enlarged and extends out beyond the width of the fiberglass strands of the row. By placing the strand 22 on the side of edge 23 as shown, the enlarged bead formation is facilitated.

It will be understood that the term "adhesive" is used in the descriptive sense, that is to say, it is a material which has the function of holding the fiberglass filaments together. The hardened adhesive also performs the function of a structural member in maintaining the strip in the elongated form illustrated. The strand 22 being impregnated and hardened also performs the function of a structural member. A structural thermoplastic may be used as the adhesive, for example, hot melt glue made by Swift & Co.

By virtue of the method of making the eraser herein, the enlarged bead formation may, for reasons which will be more apparent later on, be eliminated. This may be accomplished, for example, by positioning the reinforcing strip 22 along the edge rather than on the fibers.

The principal structural difference between the eraser disclosed herein and the eraser of my U.S. Pat. No. 4,007,509 will now be explained.

The handle of the eraser disclosed in my U.S. Pat. No. 4,007,509 is made by extruding a blank of foamed plastic and after cooling the blank, the handle pieces are automatically cut to length. The end pieces are molded. The strips forming the rows 7 through 11 are secured to the handle by cutting grooves extending inwardly from the bottom surface 3 and then inserting the strips. The blocking ro:;s are then glued on and secured by the end pieces which are also adhesively secured. The product label is applied to the top of each handle by a manual hot stamping process.

The cutting of individual handles, the cutting of the grooves, the insertion of the strips, the gluing of the blocking rows, the molding and the assembly of the end pieces, and the application of the label all require distinct and mostly hand operations. Thus, the eraser is labor-intensive and, therefore, relatively costly with respect to the conventional felt eraser.

In the present eraser all of the foregoing distinct steps are eliminated with consequent substantial savings in labor costs.

The eraser fabricated by the molding process disclosed herein provides for the manufacture of a eraser having a handle made from mold-expanded spherical plastic particles with fiberglass strips integral therewith, each fiberglass strip having an inside part encapsulated by the particles which exert pressure thereon to lock the strip in the handle and having an outside part extending outwardly from the bottom of the handle. The outside parts of the strips form cleaning means to remove material from a board.

The term "inside parts" and the term "outside parts" as used herein will be explained with reference to FIG. 7. The part of the strip which extends into the body of the handle from bottom 3 is indicate at 27. As will be observed, the inside part 27 is encapsulated by the plastic material of the handle 2. The part of the strip which extends away from the bottom 3 is indicated at 28 and this is the outside part.

In the method as will be described later herein, the fiberglass strips are arranged in a desired pattern with the inside parts inside of a cavity means and surrounded by quantity of heat expandable plastic particles. The temperature of the particles is raised. This causes the particles to expand against the cavity means to form the handle and also to expand against the inside parts and exert pressure on same sufficient to lock the strips in the handle.

In the above process, labeling for product and manufacturer information is placed on the handle during the molding operation by virtue of a die on the inside of the cavity means.

Figure 5:
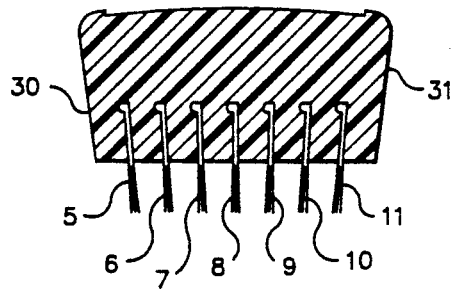
FIG. 5 is a cross-section taken along the lines 5—5 of FIG. 1.
Figure 6:
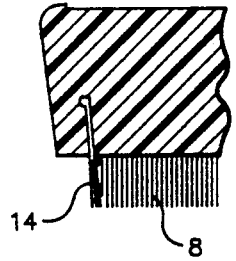
FIG. 6 is a fragmentary, cross-sectional view taken on the lines 6—6 of FIG. 1.

The fact that the molding process exerts pressure on the inside parts of the strip is indicated by the orientation of the inside parts as shown in FIGS. 5 and 6. It will be observed that the pressure has caused the inside parts of strips 5, 6, 7, and 9, 10, and 11 to be inclined with the inclination being less toward the center. The inside part of strip 8 is essentially vertical.

Heat entering the mass of expandible beads from the mold first expands th particle in juxtaposition with the mold surface (outside particle) and progressively toward the center of the mass (inside particle). As the outside particles expand, they can move to fill empty spaces in the mold. When these spaces are all filled and the inside particles expand, an outward pressure gradient develops from the center of the mass to the cavity surface, causing compression of the outside particles, and an outward motion of the inside strips.

The same condition pertains at the end of the eraser as noted in FIG. 6 when the inside part of the blocking strip 14 is inclined.

Figure 7:
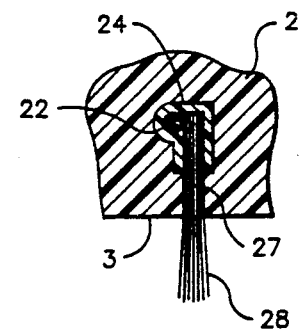
FIG. 7 is an enlarged portion of the center strip of FIG. 5.

It is pointed out that with the molding method and equipment described herein, the reinforcing strips 22 can be of smaller diameter than the diameter indicated in FIGS. 3 and 7 and the plastic bead 24 can be of a type which is flexible. The foregoing arrangement is employed where the blowing agent (pentane) for the particles may have evaporative characteristics which can cause slight distortion of the handle due to the expansion/contraction rates of the particles versus the reinforcing strip/bead.

The method and equipment for making erasers of the kind in question will now be explained.

I will first describe the equipment. Several of the steps in the method will be readily apparent from this description. The foregoing will then be followed by additional comments on the method particularly as to the kind of particles I have successfully employed and to certain pre-expansion techniques which I also have successfully employed.

Referring to FIGS. 8-15, the mold means comprises cavity former 40 shown in FIGS. 8-12 and a temperature conditioner 41 shown in FIGS. 14 and 15.

The cavity former 40 holds the particles and fiberglass strips in ready condition for expansion. For raising the temperature of the particles for expansion and lowering the temperature of the formed eraser, the fixture is deposited in the temperature conditioner 41 where it is subjected to a hot and then a cool bath of water.

The cavity former 40 includes the fixture 42, the receiver 43, and the shaper 44. The fixture 42 comprises the base 45 and the clamp 46.

The base 45 has a flat top 50, a pair of legs 51, a plurality of transverse slots 52, and at opposite ends of the base, a pair of longitudinal slots 53 and 54.

Figure 8:
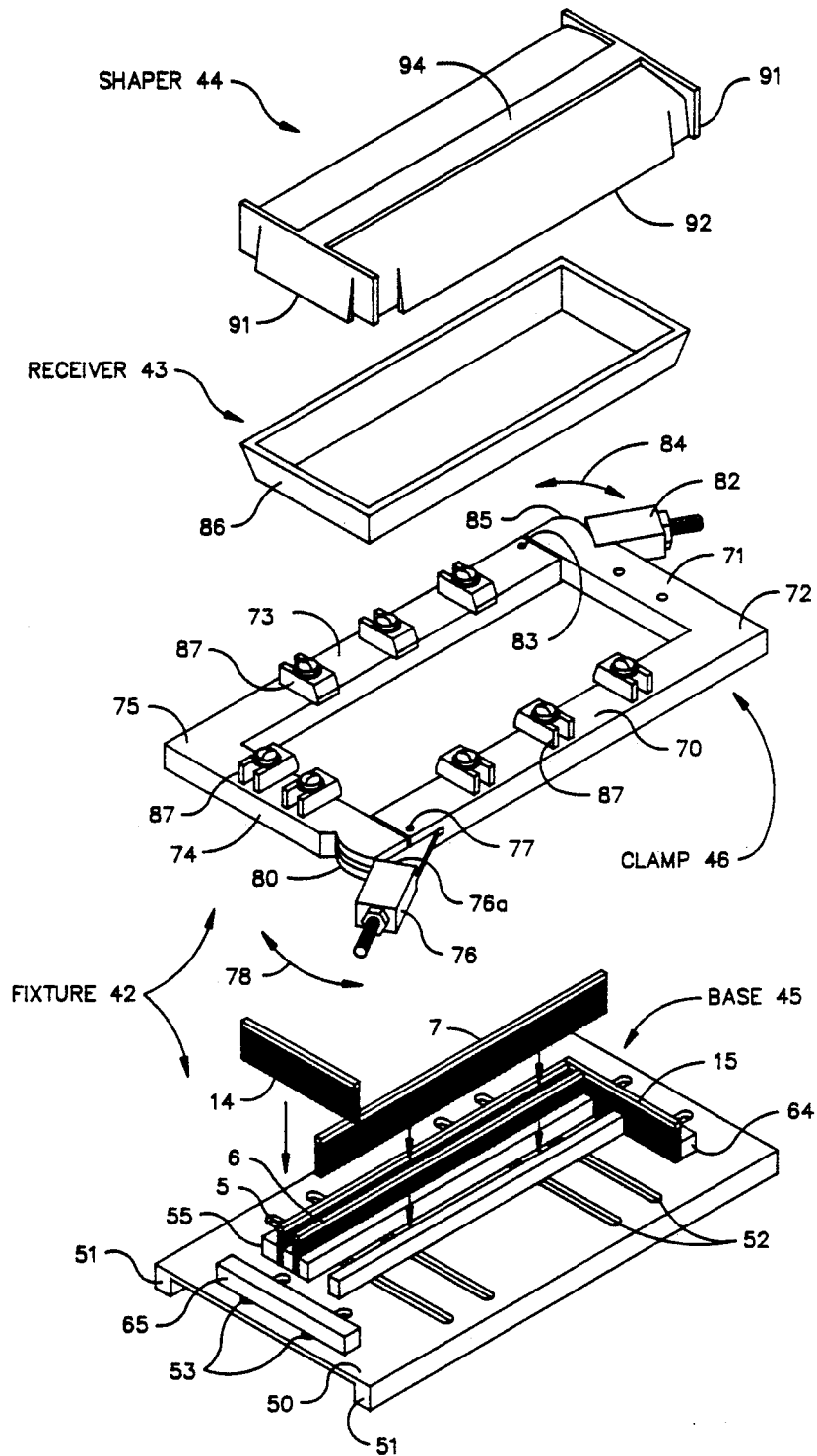
FIG. 8 is an exploded view of the components of cavity former for the manufacture of the eraser.

The base 45 carries a plurality of longitudinal grippers 55-62 which extend parallel to one another along the longitudinal axis of the base. In FIG. 8 I have shown three of such grippers while in FIG. 9 I have shown eight grippers to accomodate the seven strips 5-11.

The longitudinal grippers 55-62 can be adjusted to any transverse position by slide means which comprises the bolts 63, the heads of which engage the underside of the top 50 and the shanks of which extend up through the transverse slots 52 and then are threaded into the longitudinal grippers 55-62.

At its opposite ends, the base 45 carries the transverse grippers 64 and 65 which extend across the base and are oriented normal to the longitudinal grippers 55-62.

The transverse grippers 64 and 65 can be adjusted to any longitudinal position by slide means which comprise the bolts 66 and 67, the heads of which engage the underside of the top 50 and the shanks of which extend up through the longitudinal slots 53 and 54 and then are threaded into the transverse grippers 64 and 65.

The row-forming strips 7-11 and the blocking strips 14 and 15 are placed between and held by the grippers as explained following.

Normally, one of the outside longitudinal grippers will be locked in a desired locating position, for example, the outside gripper 55. The other longitudinal grippers 56-62 will be moved to provide space between the adjacent grippers. The transverse grippers 64 and 65 are backed away from the ends of the longitudinal grippers to provide for space.

The various row-forming strips are placed between adjacent longitudinal grippers down against the top 50 of the base and then the longitudinal grippers are moved to close the spaces.

The blocking strips 14 and 15 are then placed down between the respective ends of the longitudinal grippers and the transverse grippers 64 and 65 which are then moved to push the blocking strips up against the respective ends of the longitudinal grippers and close off the spaces.

Figure 9:
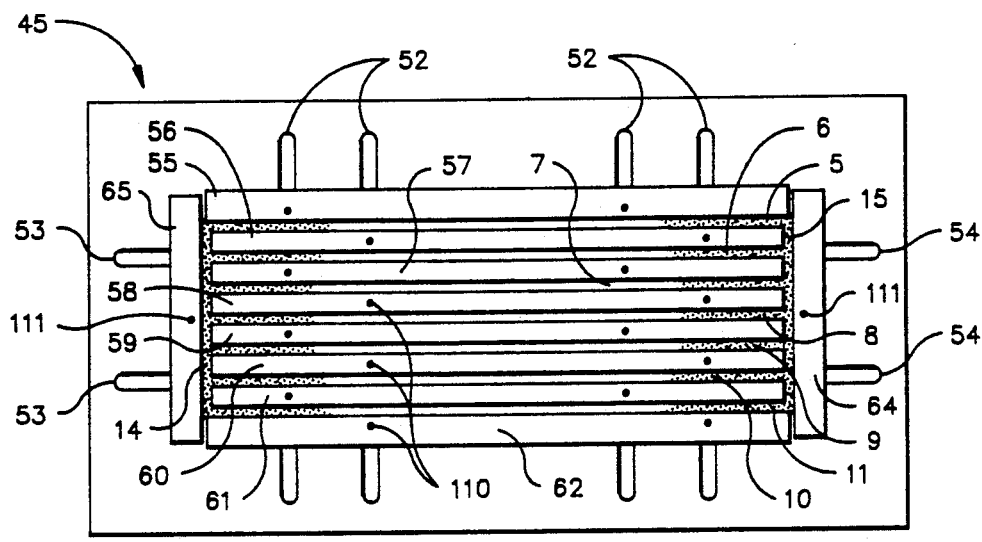
FIG. 9 is a plan view of certain of the components of FIG. 8 in assembled condition.
Figure 10:
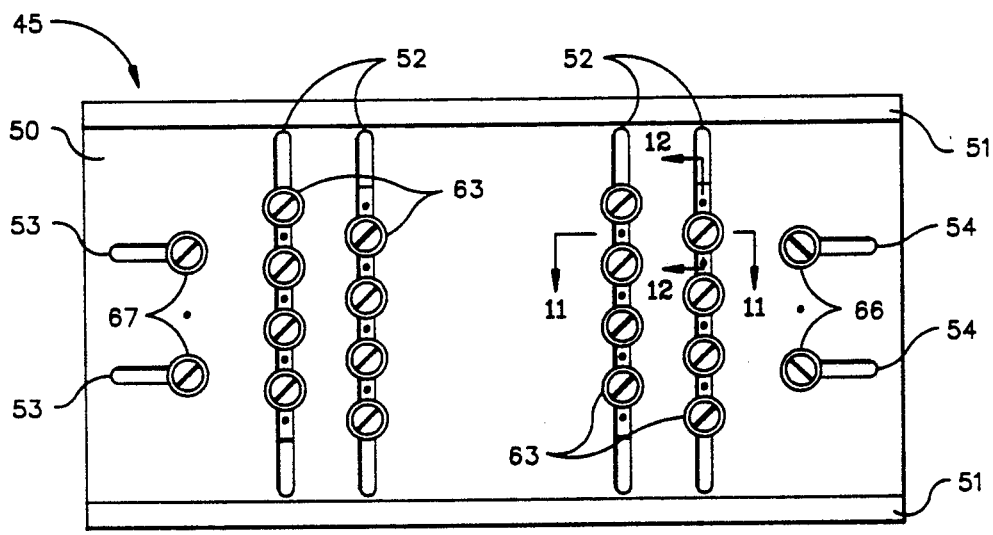
FIG. 10 is a bottom view of FIG. 9.
Figure 11:
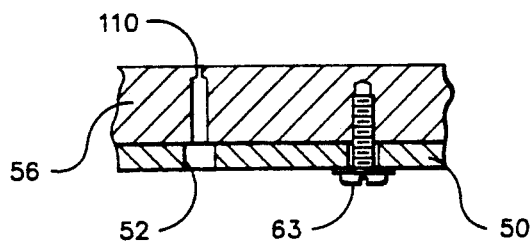
FIG. 11 is a fragmentary sectional view taken along the lines 11—11 of FIG. 10, but turned 180°.

The array of longitudinal grippers and row-forming strips and transverse grippers and blocking strips is in the condition as shown in FIG. 9.

Figure 12:
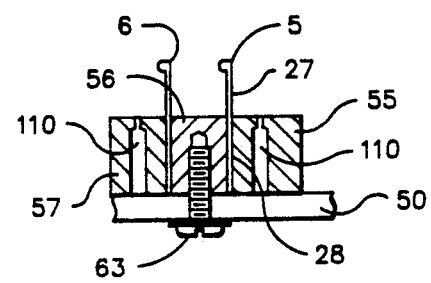
FIG. 12 is a fragmentary sectional view taken along the lines 12—12 of FIG. 10, but turned 180°.

The height of each gripper is made the same as the length of the out side part 28 of the strip. This condition is best shown in FIG. 12 when the outside parts 28 of the strips 7 and 8 are down against the top 50 of the base between the longitudinal grippers 55 and 56. The inside parts 27 of the strips 6 and 7 extend above the surface of th grippers. The foregoing condition is also shown in FIGS. 8 and 13.

Preferably the sides of the grippers which engage the strips are provided with a thin layer of yieldable material such as self-adhering room temperature vulcanized silicon rubber adhesive (RTV). This is done by milling a shallow slot and wiping in the material. The yieldable silicon helps to maintain the strips in the desired position.

The other part of the fixture 42 is the clamp means 46. The clamp means 46 is adapted to be placed down on the top 5 of the base wherein the clamp means surrounds the longitudinal and transverse grippers. Closure means on the clamp means is then manipulated which causes the clamp to engage and push the longitudinal and transverse grippers inwardly so the grippers assume a very tight engagement with the strips. The details of the clamp mechanism will now be described.

The clamp has first and second arms 70 and 71 with one end of each arm being joined at 72 whereby the arms extend normal to one another. The clamp also has third and fourth arms 73 and 74 with one end of each arm joined at 75 so the arms extend normal to one another.

A first cam follower 76 is pivotally connected to the opposite end of the first arm 70 as by pivot 77 so that the follower can swing in the direction indicated by arrows 78. A first cam surface 80 is formed on the opposite end of the fourth arm 74. When the follower 76 is swung in the direction of the arrows 78, the follower surface 76a will engage or release from the cam surface 80.

A second cam follower 82 which has the same structure as follower arm 76 is pivotally connected to the opposite end of the third arm 73 as by pivot 83. The arm 82 can swing in the direction of the arrows 84. The second arm 71 has a second cam surface 85. The cam followers and surfaces are the closure means referred to above.

From the foregoing description, it will be evident that with the followers disengaged from the cam surfaces, the pair of arms can be placed down on the base in juxtaposition with the various grippers. And that when the followers are made to engage the cam surfaces, the pair of arms will be moved inwardly to engage the longitudinal and transverse grippers and move same inwardly. This motion of the grippers tightly engages the grippers with the outside parts of the strips. The inside parts of the strips extend upwardly away from the top surfaces of the grippers.

After positioning the strips as above described, the receiver 43 is manipulated so that the bottom edge of the upstanding wall 86 engages the top surfaces of the longitudinal grippers 55 and 62 and the top surfaces of the transverse grippers 14 and 15. For purposes of properly positioning the receiver, the arms 70, 71, 73, and 74 are provided with locating tabs 87 (not shown on the second arm 71). The foregoing is best seen with reference to FIG. 13.

The receiver, in conjunction with the tops of the grippers, forms a chamber. As will be apparent, the inside parts 27 of the strip extend into this chamber. The chamber is adapted to receive heat-expandable plastic particles which surround the inside parts 27. The nature of the particles and manner of filling the chamber will be described later on.

After the receiver is in place and after the heat-expandable particles have been introduced, the shaper 44 is placed down over the receiver 43 (FIG. 13). The shaper has two pair of guides 91 and 92 which assist in quickly positioning the shaper on the receiver.

The inside of the shaper has a raised die plate 93 which is formed with text or pictorials for imprinting on the top of the handle. The top side of the shaper has an abutment plate 94, the purpose of which will be explained shortly.

It will be apparent from the foregoing description that the tops of the longitudinal and transverse grippers (when the grippers are tightly engaged by the clamp means), the receiver, and the shaper form a closed cavity means containing the inside parts of the strips and the molding particles. The cavity contains the expansion of the particles and has the shape desired in the handle.

The temperature conditioning means for raising the temperature of the particles in the cavity means and for lowering the temperature of the formed eraser will be described in connection with FIGS. 14 and 15.

A hollow tank 95 has a bottom wall 96, a side wall 97, and a cover 98. As indicated, the tank is large enough to receive the cavity former 40.

The tank has a water inlet 100 on side wall 97 and a water outlet 101 which extends up from the bottom 96. The bottom 96 also has a drain 102.

The cover 98 is pivotally connected to the wall 97 by pivot 103 so the cover can be moved to an open position as noted in FIG. 14 and to a closed position as noted in FIG. 15. In the open position the cavity former 40 can be placed inside the tank or removed therefrom.

The cover has a lock means 104 which locks the cover on the closed position by the finger 105 engaging the underside of the bottom 96. A pressure pad 106 is secured to the underside of the cover.

Both hot and cold water is supplied to the tank. This is done by conventional pipes and by fittings connected to the sources of the hot and cold water.

When the cover is in the closed position, a pressure pad 106 engages abutment or pressure plate 94 on the shaper. This exerts downward pressure on the shaper and the receiver. The shaper tightly engages the receiver and the receiver tightly engages the top of the grippers and then locks the components of the cavity former together.

The overall size of the cavity former 40 is 7-$\frac{3}{4}$ inches by 3-$\frac{3}{4}$ inches by 1-$\frac{3}{4}$ inches deep. The size of the cavity created by the cavity former 40 is approximately 5-$\frac{3}{4}$ inches by 1-$\frac{3}{4}$ inches on the bottom, 6 by 1-$\frac{7}{8}$ inches on the top, and approximately 15/16 inches in depth. It provides a volume of approximately 10.4 cubic inches.

The size of the tank 95 is 11 inches by 4-3/4 inches inside and 2-$\frac{1}{2}$ inches in depth. These dimensions provide for reception of the cavity former 40 and for adequate flow of hot and cold water for temperature control purposes.

I have not shown the temperature conditioner 41 to be insulated. It will be understood that insulation is provided for energy conservation purposes. The insulation may surround the tank for the temperature raising operation and removed for the temperature lowering operation.

Basic steps in the method will be evident from the foregoing description namely that fiberglass strips are arranged in a desired pattern with the inside parts inside of a cavity and surrounded by heat expandable plastic particles and the temperature of the particles is raised to cause the same to expand against the cavity and form the handle and also to expand against and exert pressure on the inside parts and then the temperature of the handle is lowered and the same is removed from the cavity in ready condition for shipment without further working. The pressure exerted by the expanded particles is sufficient to lock the strips in the handle.

I will now comment on certain factors which are important in the process particularly the type and charge, quantity of the particles, the level and duration of the temperature elevation, and the time of temperature reduction.

The spherical particles which I have successfully employed are polystyrene beads manufactured by Arco/Polymers Inc. of Monaca, PA and sold under the brand name Dylite. These particles normally have a volatile hydrocarbon blowing agent in the form of pentane.

The terms spherical particle or bead are employed in the trade for descriptive purposes and is likewise used herein. In the unexpanded state, the particles or beads are nearly true spheres. In the expanded state the particles or beads are globoids having continuous surfaces formed in random exterior shapes.

The size of the spherical particles used in forming handles with the fiberglass cleaning means integral therewith have been in the range of 0.047–0.023 inches (U.S. Sieve). Such particles are sold under the product designation Dylite D-40.

In using the particles described above to form erasers, I have included a pre-expansion phase. The amount of preexpansion and the quantity of the charge placed in the cavity for final expansion into an eraser will now be commented on.

For pre-expansion, I take 20 grams of raw beads mixed with 20 grams of a 5 percent water solution of a detergent. The detergent which I have successfully employed is sold by Procter and Gamble of Cincinnati, OH under the brand name JOY. This detergent is made under one or both of U.S. Pat. Nos. 4,133,779 and 4,316,824.

The particles and solution or charge is contained in a preexpansion vessel and the temperature of the mix is raised to approximately 200° F. and held for approximately 1-½ minutes. During the pre-expansion it is important that the charge be stirred.

The detergent and the stirring keeps the particles in a singular rather than a clumped-together state and this helps to achieve somewhat simultaneous pre-expansion of the individual particles. The singular and pre-expansion condition is highly desirable with respect to achieving uniform dispersion of the charge around the inside parts of the fiberglass strips as noted below.

A relatively easy way in which I have accomplished pre-expansion is explained following. A vessel 2-¾ inches in diameter and 2-¾ inches in height containing the charge is set down in a shallow stream of water at about 210° F. To gauge the desired amount of expansion, a mark is located on the inside wall of the vessel at one inch from the bottom. When the charge has expanded up to the line, the vessel is removed from the hot water stream.

After pre-expansion, the charge is then placed on the receiver 43. This is done in a special way which will now be described.

First, with reference to FIGS. 9–12, the grippers 55–62 are provided with tiny drain holes 110. These drain holes are located to be in vertical alignment with the slots 52 in the top 50 of base (see FIG. 11). The grippers 64 and 65 are each provided with the same kind of drain hole as indicated at 111. The drain holes provide for the exit of water as explained below.

With the base fiberglass strips in the grippers, the clamp, and receiver assembled, the pre-expansion vessel is placed over the receiver and the preexpanded particles slowly poured into the receiver. The pour is done in conjunction with the use of a water jet. The water causes the particles to flow down into the receiver and around the inside parts of the fiberglass strips. The singular and pre-expansion condition of the particles mentioned above is conducive to the individual particles being substantially uniformly distributed around the inside parts of the fiberglass strips and throughout the space in the cavity. Such distribution is important to achieve. As the water goes to the bottom it drains out of the holes 110 and 111. The water is recirculated and generally contains some detergent solute. The water jet can be used to flush any remaining pre-expanded particles from the vessel.

The water jet can be created by using a plastic bottle with a nozzle. The bottle is squeezed and the water streams out of the nozzle.

After all of the particles have been placed in the receiver and thoroughly dispersed around the inside parts of the fiberglass strips, the shaper 44 is put into place and the cavity former 40 put into the tank 95, the cover 96 closed, and the final expansion phase can begin.

With the components as above described, I use a hot water stream having a temperature of approximately 210° F. and run the stream over the cavity former for a period of 30 minutes. I have found the foregoing combination of temperature and time period provides for an expansion that gives smoothness in the finished surface and holds the fiberglass strips in place.

After the temperature raising phase, the hot water is drained and cool water are about 60° F. is run through the tank for a period of about five minutes. Tap warer is normally satisfactory. This cools down the formed eraser so that the cover 96 can be released, the cavity former 40 removed from the tank 96, the shaper 44 taken off, and the clamp 46 operated to release the grippers. The finished eraser then can be removed in ready condition for shipment.

When the individual particles are substantially uniformly distributed around the inside parts of the fiberglass strips and throughout the space in the cavity, the fusion of adjacent particles has a desirable affect on stress distribution in the handle and on the appearance of the outside surface. With respect to the latter condition, in FIG. 16 I have shown a small section of outside surface wherein it will be seen that the particles P are all cleanly knitted together.

In connection with lowering the temperature of the handle, it will be understood that this is a practical necessity. When final expansion has been achieved, the temperature of the formed handle is close to 210° F. and is in a pentane pressurized, semi-pliable state. If the handle were then taken out of the cavity, distortion would take place.

It is evident that rather than taking a positive step of cooling, the same result would be achieved by shutting off the hot water and permitting the temperature conditioning means 41 and cavity former 40 to loose heat by conventional ways of radiation, convection, and conduction. In essence, therefore, the elements 40 and 41 by virtue of the structure of their components have a means for reducing the temperature and so inherently induce the step of temperature reduction. However, the foregoing manner of temperature reduction results in causing the eraser forming process to extend over a long period of time or the use of many, many more mold means to achieve the same production rate as achieved with positive temperature reduction means.

Thus, without a positive imposition of temperature reduction, desirable cost/efficiency levels in production will not be achieved.

I claim:

1. A mold for use in for making a board eraser by molding a handle with row-forming and blocking fiberglass strips integral therewith, each fiberglass strip having an inside part and an outside part, the inside part being secured in the handle by the molding material exerting pressure thereon and the outside part projecting outwardly from the bottom of the handle and the outside parts forming board cleaning means, the mold comprising:

an elongated base;

a plurality of longitudinal grippers mounted on said base and extending parallel to one another along the longitudinal axis of the base;

adjacent each opposite end of said base, a transverse gripper extending across the base and being oriented normal to said longitudinal grippers;

means on said base connected to each of said longitudinal grippers and providing for each longitudinal gripper to be moved to different transverse positions on said base;

said motion of the longitudinal grippers providing for adjacent longitudinal grippers to receive the outside portions of a row forming strip therebetween;

means on said base connected to each of said transverse grippers providing for each transverse gripper to be moved to different longitudinal positions on said base;

said motion of the transverse grippers providing for a transverse gripper and the ends of adjacent longitudinal grippers to receive the outside portion of a blocking strip therebetween;

first and second arms for mounting on said base, one end of each first and second arm being joined together so the first and second arms extend normal to one another;

third and fourth arms for mounting on said base, one end of each third and fourth arm being joined together so the third and fourth arms extend normal to each other;

a first cam follower pivotally connected to the opposite end of said first arm;

a first cam surface adjacent the opposite end of said fourth arm to be engaged by said first cam follower, the engagement causing the first arm and the fourth arm to tightly engage;

a second cam follower pivotally connected to the opposite end of said third arm;

a second cam surface adjacent the opposite end of said second arm to be engaged by said second cam follower, the engagement causing the second arm and the third arm to tightly engage;

said cam surfaces and cam followers when engaged orienting said first, second, third, and fourth arms to form an annular clamp means to surround and engage said longitudinal and said transverse grippers and cause the same to tightly grip the outside parts of the row-forming and blocking strips therebetween and said cam surfaces and cam followers when not engaged providing for the annular clamp means to release said longitudinal and transverse grippers;

an annular receiver having upstanding walls to be positioned on said longitudinal and transverse grippers when the same grip the outside portions row-forming and blocking strips;

said longitudinal and transverse grippers, when engaged by said clamp means and said receiver, when mounted on said grippers, forming a trough for receiving heat expandable particles;

a hollow shaper dimensioned to be positioned on said receiver when the same is positioned on said longitudinal and transverse grippers; and said longitudinal and transverse grippers when engaged by said clamp means, said receiver, and said hollow shaper forming a cavity containing said inside parts of the strip, the cavity being for the containment of the expansion of said heat expandable particles whereby to form the handle.

2. The equipment of claim 1 further including means for raising and lowering the temperature of said cavity to cause expansion of said heat expandable particles and for cooling the formed eraser comprising:

a hollow tank having a bottom wall;

a water inlet and a water outlet on the tank and respectively positioned to provide for circulation of water through the tank;

the tank being dimensioned to receive said mold means with the base of the mold means on said tank bottom;

a cover pivotally mounted on one end of the tank for movement between an open and a closed position and when the cover is in said closed position, the cover facing said bottom wall;

lock means to releasably secure the cover on the tank in the closed position; and a pressure pad on the underside of side cover adapted to engage the said shaper when said mold is mounted in the tank, the engagement exerting a holding pressure on the shaper.

3. The mold of claim 1 further including:

a plurality of locating tabs respectively on said first, second, third, and fourth arms, the tabs being positioned to engage the upstanding walls of said receiver and position the receiver on said grippers.

4. The mold of claim 1 further including temperature conditioning means having mechanism to surround said cavity means with hot liquid to raise the temperature of said particles and to surround said cavity means with cold liquid to lower the temperature of the handle formed in the cavity means.

* * * * *